United States Patent [19]

Florence

[11] 4,236,742
[45] Dec. 2, 1980

[54] RETRACTABLE RAKE
[76] Inventor: Otis Florence, 809 Iroquois Ave., Louisville, Ky. 40214
[21] Appl. No.: 45,271
[22] Filed: Jun. 4, 1979
[51] Int. Cl.³ .......................................... A47F 13/06
[52] U.S. Cl. ................................. 294/24; 294/19 A; 294/49; 56/400.19
[58] Field of Search ................. 294/19 A, 19 R, 24, 294/49, 50, 9, 53.5; 273/162 E, 32 F, 75, 81 D, 162 R, 186 E; 56/400.19, 400.18, 400.02, 400.2

[56] References Cited
U.S. PATENT DOCUMENTS

| | | | |
|---|---|---|---|
| 802,264 | 10/1905 | Brown | 294/19 A |
| 3,306,650 | 2/1967 | Zaqwyn | 294/24 |
| 3,390,516 | 7/1968 | Burrows | 56/400.19 |

Primary Examiner—James B. Marbert
Attorney, Agent, or Firm—Richard L. Caslin

[57] ABSTRACT

A retractable rake is shown as in one example for use as a courtesy rake by a golfer at a sand trap, or for light raking chores, in general. The rake has a plurality of projecting tines which diverge outwardly when they are in their extended position. When the rake is not in use, the tines are retractable into the shank of the rake so the rake is compact and may be stored and carried within the golf bag.

9 Claims, 5 Drawing Figures

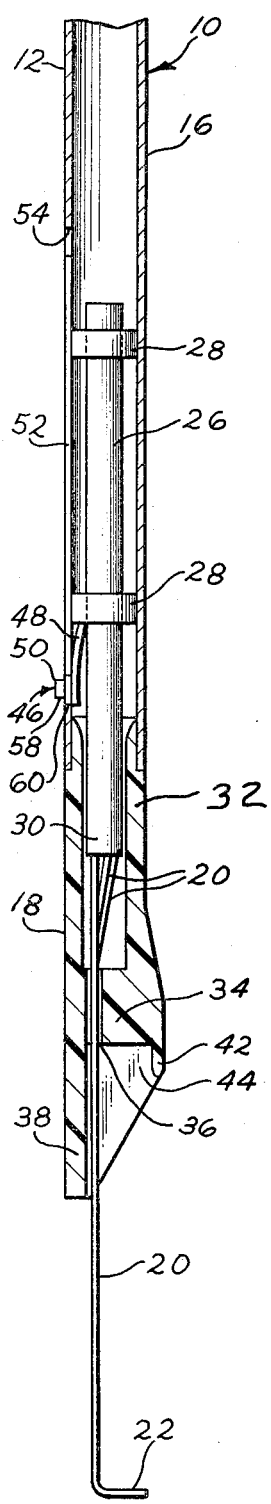
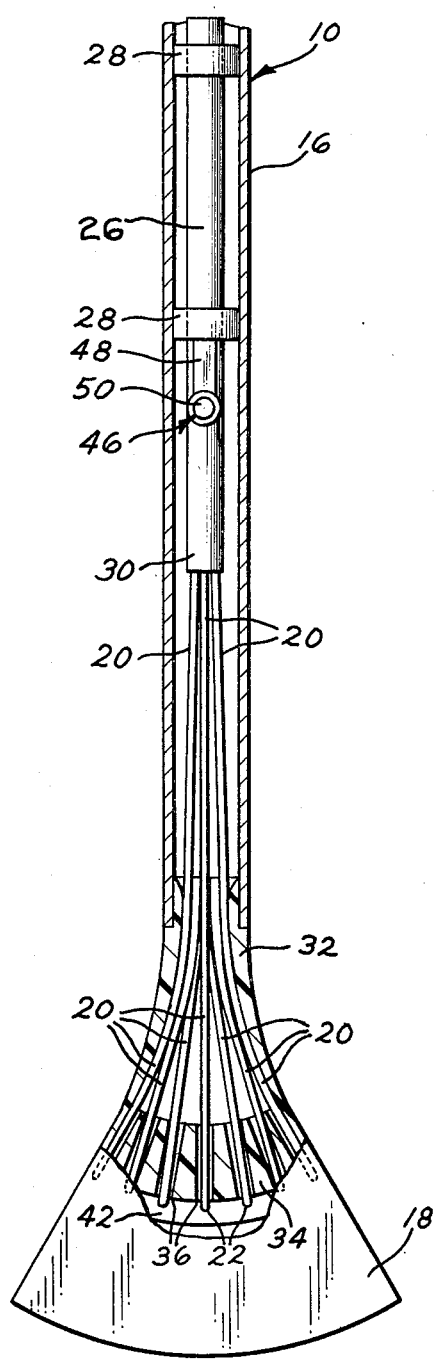
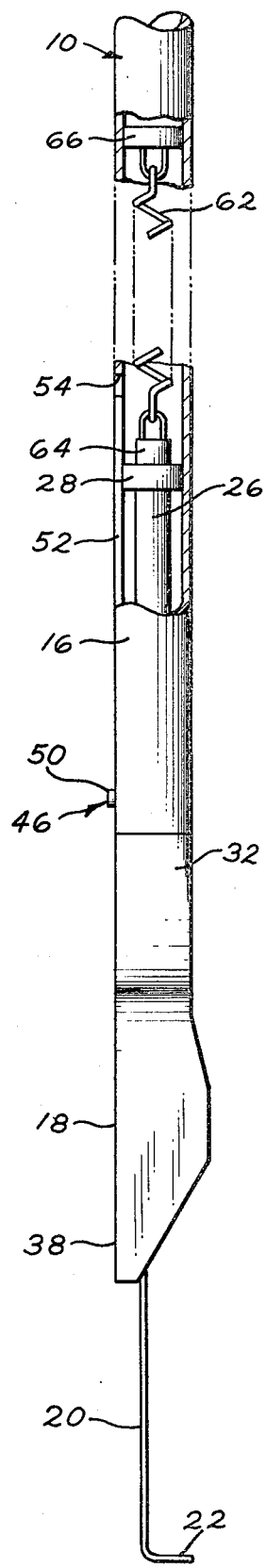
FIG. 3
FIG. 4
FIG. 5

RETRACTABLE RAKE

BACKGROUND OF THE INVENTION

1. Field of the Invention

This invention relates to the art of hand rakes and other hand implements for gathering materials or loosening or smoothing the surface of the ground. This invention is particularly related to light weight, compact rakes which are easy to carry and use by a golfer during a golf game. 2. Description of the Prior Art A collapsible rake is shown in the Burrows U.S. Pat. No. 3,990,516. This Burrows rake was especially designed as a portable rake for use by golfers as they play so as to be available at the instant of need to smooth sand traps and remove debris from their path of play. This Burrows rake is a collapsible or folding rake which is quickly convertible from a useful rake into a compact package. The Burrows rake has a hollow handle supporting an inner shaft and a sliding collar. The shaft is connected to a foldable plastic rake head that has two rake members and two supporting arm members pivotably connected at their ends to the rake member. The rake head is adapted to be drawn into the hollow handle and to be withdrawn therefrom. The proportions of this Burrows' rake appear to be quite unusual when comparing the large width of the rake head with the short length of the handle. It would appear that the shortness of the Burrows rake would cause it to get lost inside the golfers bag amongst the golf clubs.

The expired Jenkins U.S. Pat. No. 1,916,052 relates to a full size, a yard rake, where the rake head may be laterally extended and retracted at the will of the user in order to facilitate access to restricted areas, as underneath and between hedges and bushes. The rake head is adjustable because it has a plurality of pivotally mounted overlapping sections, and each section carries at its free end a series of uniformly spaced, resilient teeth or tines. This collapsible rake has a cam slot arrangement for operating the lateral extension and retraction of the rake teeth or tines. This rake also has a single, retractable prong that serves as a spear point for picking up paper and other debris.

The expired Potemkin U.S. Pat. No. 2,072,992 is another collapsible rake design this is similar to the design of the Jenkins patent. Potemkin has a long rigid handle supporting a plurality of flexible tines, with means being provided for adjusting the spaces between the tines. This adjustability allows the tines to be substantially closed to facilitate storage. There is a movable tine support member supported from the handle which controls the spacing of the tines.

The Huspen U.S. Pat. No. 3,750,379 shows another design of collapsible rake similar to the Potemkin rake where there is a movable tine support member which is capable of adjusting the spacing between the tines. By changing the position of the tine support member on the handle, the width of the swath of the rake can be regulated.

OBJECTS OF THE PRESENT INVENTION

The principal object of the present invention is to provide a light weight, hand rake with retractable tines, where the rake is generally usable by one hand, as for use as a courtesy rake by golfers at sand traps.

A further object of the present invention is to provide a light weight rake of the class described that has a handle similar to the shank and handle of a golf club.

A further object of the present invention is to provide a retractable rake of the class described with locking means for locking the tines in both their extended and retracted positions.

A further object of the present invention is to provide a retractable rake of the class described where the tines are capable of telescoping into the shank of the rake.

A still further object of the present invention is to provide the retractable rake of the class described with spring means for retracting the tines into the shank of the rake.

SUMMARY OF THE INVENTION

The present invention provides a light weight rake with retractable tines to facilitate storage of the rake. The rake has an elongated handle with an upper handgrip and a lower hollow shank portion. The shank portion supports a movable plunger that carries a plurality of flexible tines. In a first extended position, the tines diverge outwardly in a fan shape. Manual actuator means are joined to the plunger so as to be able to retract the projecting tines into a second retracted position within the shank portion.

BRIEF DESCRIPTION OF THE DRAWINGS

This invention will be better understood from the following description taken in conjunction with the accompanying drawings and its scope will be pointed out in the appended claims.

FIG. 3 is a fragmentary cross-sectional side view of the lower portion of the rake, taken on the line 3—3 of FIG. 1, showing the locking means for locking the tines in their extended position.

FIG. 4 is a fragmentary plan view, partly in cross section, of the lower portion of the rake, similar to FIG. 2, but showing the flexible tines telescoped back into their retracted position.

FIG. 5 is a fragmentary side view, partly in cross-section, of a modification of the rake of FIGS. 1-4, showing the use of a tension spring within the hollow shank of the rake to assist in retracting the tines into the shank, as well as contribute to the locking action of the tines in their two extreme positions.

DESCRIPTION OF PREFERRED EMBODIMENTS

Figures 1, 2:
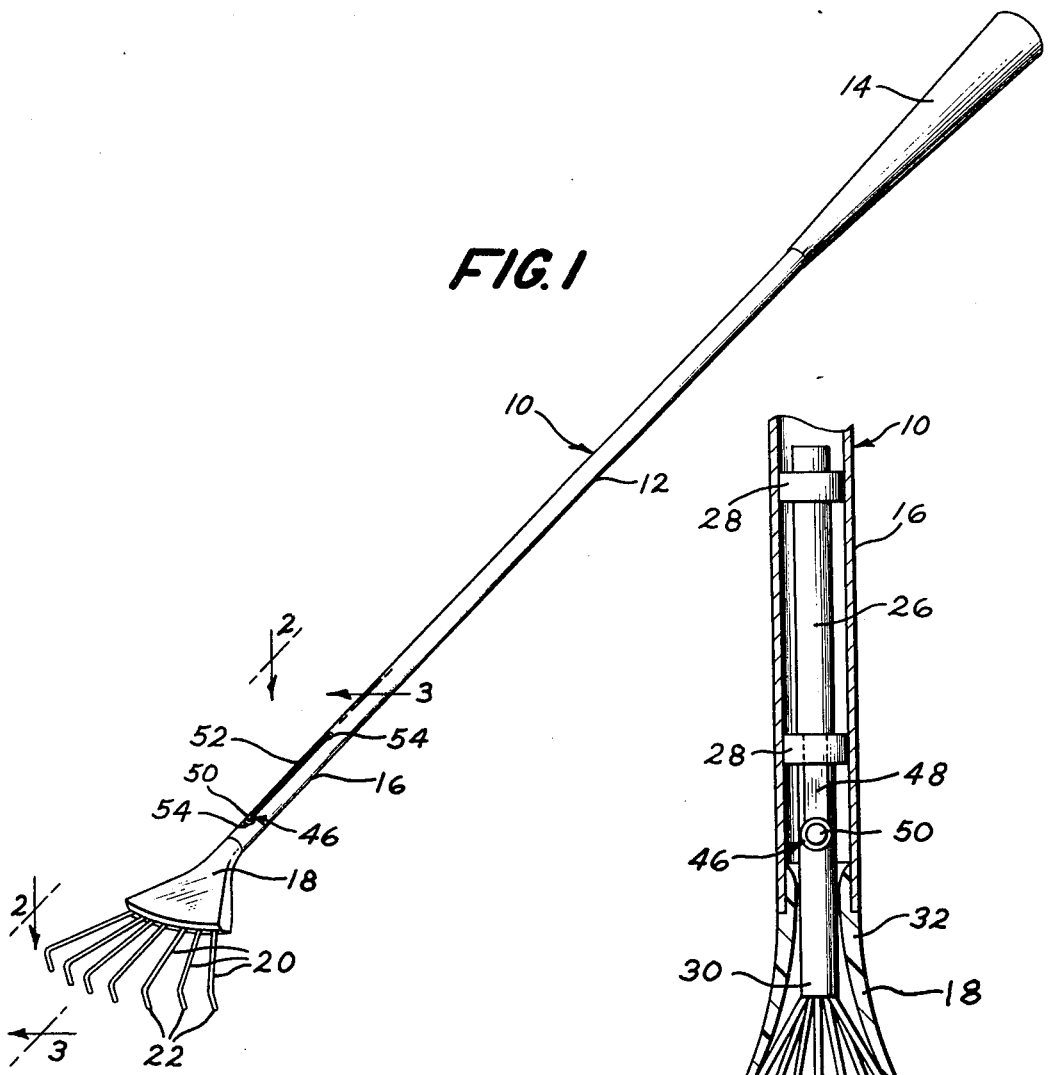
FIG. 1 is an overall perspective view of a light weight rake with retractable tines that is made according to the present invention.
FIG. 2 is a fragmentary cross-sectional plan view on an enlarged scale of the lower portion of the rake, taken on the line 2—2 of FIG. 1, showing the flexible tines in their extended position.

Turning now to a consideration of the drawings and, in particular, to the overall perspective view of FIG. 1, there is shown a light weight rake 10, according to the present invention. The rake has an elongated handle 12 with an upper handgrip portion 14 and a lower hollow shank portion 16. The lower portion of the shank 16 is fitted with a small flared head 18. A plurality of flexible tines 20 are shown diverging out of the head 18. Each tine 20 has a downturned finger 22 for use in scratching or smoothing the soil or sand or in engaging debris when cleaning up an area.

An understanding of the operation of the retractable tines 20 can best be obtained from an explanation of the cross-sectional plan view of FIG. 2. The elongated handle 12 may be of the general size and shape of a standard golf club handle. As mentioned above, the lower shank portion 16 is hollow. Within the shank is provided a movable plunger 26 which is fitted with a spaced pair of cylindrical bearings 28 to permit sliding movement of the plunger within the shank. The outermost end 30 of the plunger is shown provided with a plurality of the flexible tines 20, that are fastened together by means that are not shown. Such tines 20 are formed by strong, thin metal stock, but plastic stock would suffice if it were as strong and durable as metal.

The tines 20 have two extreme positions, the extended, fan shaped position of FIG. 2, and the retracted, generally parallel position of FIG. 4. The preferred embodiment of the present invention employs a small, flared, hollow head 18 of plastic material, or the like, which is fastened to the lower end of the hollow shank 16. This head 18 is small and cylindrical at its end 32 which is attached to the end of the shank 16. In effect, the head is an extension of the shank, and may be considered as a part thereof. This head is generally of flat configuration in side view as is seen in FIG. 3, while it flares outwardly in plan view, as is seen in FIGS. 1 and 2. Within the head 18 is an arcuate partition 34 which is provided with a plurality of through-slots 36, each for receiving one of the tines 20 therethrough. This partition 34 is rather thick so the slots 36 will be relatively long for reinforcing the tines when the rake is in use.

Moreover, as is seen in FIG. 3, the top side of the head 18 is extended outward, as at 38, to overlie and engage across all of the tines 20, again to reinforce the tines when the rake is in use. The bottom side of the head 18 also has a short, outward flange 42 to form a recess 44 for receiving the fingers 22 therein when the tines are fully retracted, as is seen in FIG. 4.

It is well to provide the movable plunger 26 with a releasible locking means 46 for locking the tines in their two extreme positions; the extended position of FIG. 2 and the retracted position of FIG. 4. The locking means 46 comprises a leaf spring 48 that supports on its free end a button 50. This button is positioned to slide the length of an elongated slot 52. At each end of the slot 52 is an enlarged circular detent portion 54. Notice in FIG. 3, that the button 50 has a small diameter, circular tip 58, and a larger diameter, circular base 60. The smaller tip 58 fits snugly in the elongated slot 52 when the button 50 is depressed against its spring 48 and pushed into the slot. When the button 50 reaches either end of the slot 52, the larger base 60 of the button will snap into the circular detent portion 54 and become locked therein, until it is manually depressed and shifted into the slot 52.

The modification of FIG. 5 shows a helical tension spring 62 that is fastened at one end to the innermost end 64 of the plunger 26, and fastened at its opposite end to a fixed brace 66 within the hollow shank 16. The use of this spring 62 will assist the locking means 46 from becoming inadvertently released during the use of the rake for its intended purposes. The spring 62 also assists the locking means 46 in the retracted position of the tines. Moreover, the spring 62 serves to retract the tines 20 when the button 50 is depressed from the detent 54 of the extended position of FIG. 3.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A retractable rake comprising:
   a. an elongated handle having an upper handgrip portion and a lower hollow shank portion;
   b. the said shank portion having an enlarged hollow head fitted on the lower end thereof, the head having a partition with a series of diverging, elongated slots therein for receiving flexible tines therethrough;
   c. the shank portion supporting therein a movable plunger that carries a plurality of flexible tines that in a first extended position diverge outwardly from the enlarged head so the tips are widely spaced from each other and they are disposed generally within a common plane, the said elongated slots serving to reinforce the tines against flexing in their first extended position;
   d. and manual actuator means joined to the plunger and accesssible on the outside of the shank portion for retracting the plunger into the shank portion so as to retract the flexible tines and telescope them into a second retracted position substantially into the head and shank portion.

2. The invention of claim 1 with the addition of locking means for locking the movable plunger into a position where the flexible tines are in their first extended position.

3. The invention of claim 2 wherein the said shank portion includes an elongated longitudinal slot, and the said manual actuator means includes a button that is confined in the said slot, the lower portion of the slot including a detent portion for receiving the said button therein and serving as the said locking means for the plunger.

4. The invention of claim 3 wherein the said hollow shank portion includes tension spring means joined to the said plunger for retracting the plunger whenever the actuator button is released from the said detent portion of the longitudinal slot.

5. The invention of claim 4 wherein the said retractable rake is about the length of a standard golf club, and the rake is adapted for storage and carrying in a golf bag.

6. The invention of claim 3 wherein the said elongated longitudinal slot has a detent portion at each end of the slot for locking the plunger in both its first extended position and its second retracted position.

7. The invention of claim 3 wherein the said button is spring-supported from the said plunger for movement in and out of the said detent portion.

8. The invention as recited in claim 1 wherein the said enlarged head has a top overhanging wall in engagement with the top portion of the tines in their first extended position for increased reinforcement of the flexible tines as well as for creating a recess within which the tips of the tines may be stored when the tines are fully retracted.

9. A courtesy rake for use by golfers comprising:
   a. an elongated handle of about the size and shape of a golf club handle and having a lower hollow shank portion;
   b. a small flared hollow head attached to the lower end of the shank portion, and having a partition with a plurality of diverging through-slots;

c. a movable plunger slidably mounted within the shank portion;

d. a plurality of flexible tines joined to the plunger and extending through the said partition;

e. and manual actuating means for moving the tines of the plunger between a first extended fan shaped position to a second retracted generally parallel position.

* * * * *